Aug. 27, 1940.  H. D. FOSTER  2,212,770
PROCESS FOR FORMING FILMS FROM SYNTHETIC LINEAR POLYMERS
Filed July 12, 1939
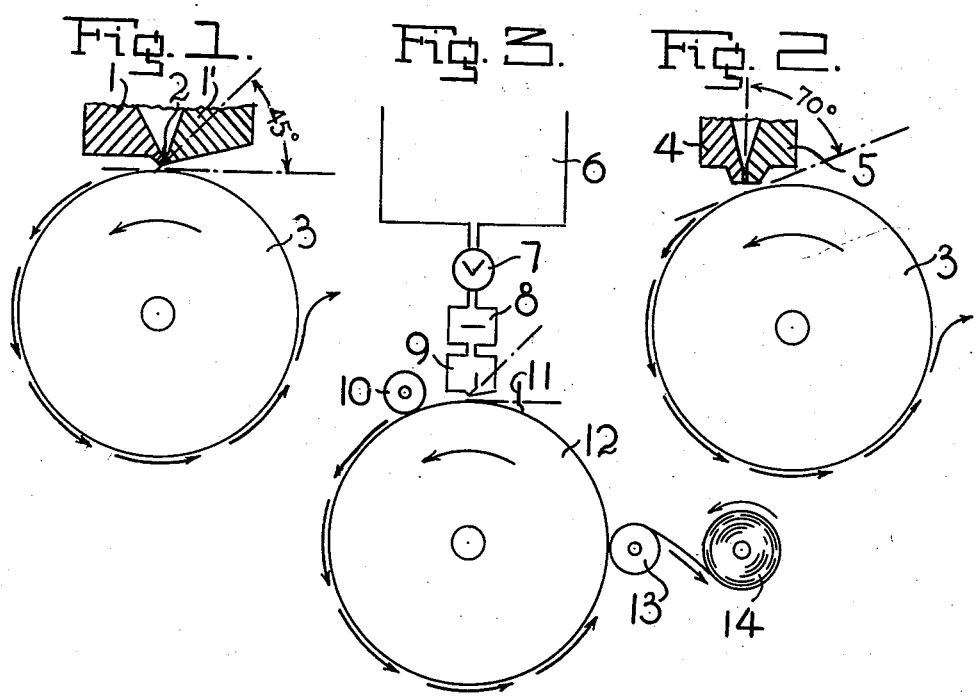
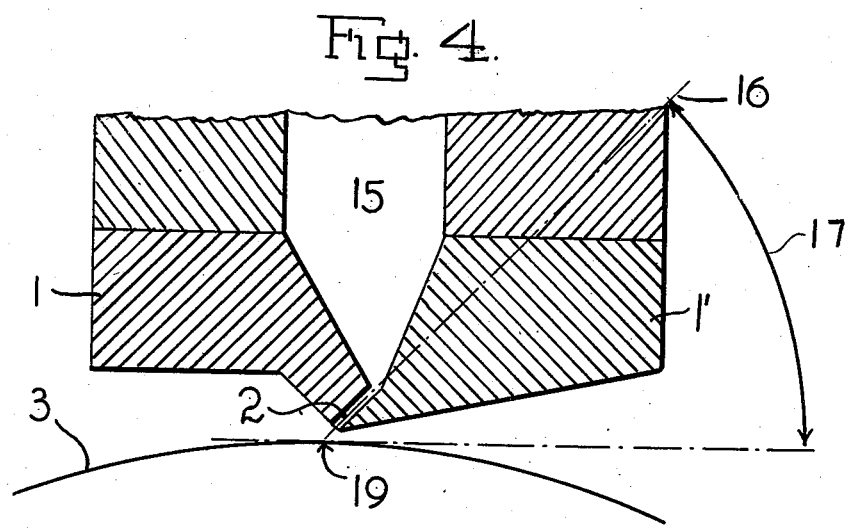
Inventor.
Henry D. Foster
By R. F. Miller
Attorney Patented Aug. 27, 1940

2,212,770

UNITED STATES PATENT OFFICE 2,212,770

PROCESS FOR FORMING FILMS FROM SYNTHETIC LINEAR POLYMERS

Henry D. Foster, Wilmington, Del., assignor to E. I. du Pont de Nemours & Company, Wilmington, Del., a corporation of Delaware Application July 12, 1939, Serial No. 284,065

11 Claims. (Cl. 18—57)

This invention relates to synthetic linear polymers and more particularly to a process for their preparation in the form of smooth transparent films.

The synthetic linear polymers with which this invention is primarily concerned are the fiber-forming polymers or superpolymers described in Patent 2,071,250. Of these polymers, the polyamides described in Patents 2,071,253, 2,130,523, and 2,130,948 are particularly useful in the practice of this invention. The polyamides are of two types, namely, those obtainable from polymerizable monoaminomonocarboxylic acid and those obtainable from diamines and dibasic carboxylic acids. In these polyamides the amide groups form an integral part of the main chain of atoms in the polymer. As indicated in the above mentioned patents these synthetic linear polymers may be formed into filaments which can be cold drawn into fibers which show by characteristic X-ray diffraction patterns a microcrystalline structure and orientation along the fiber axis. Orientation may also be effected by the application of compressive stress such as that which takes place in the cold rolling of films or sheets of the polymer.

This invention has as an object a new and improved method for the preparation of smooth, uniform, transparent films from synthetic linear polyamides and other fiber-forming linear polymers. Other objects will appear hereinafter.

Broadly speaking these objects are attained by extruding the molten polymer in the form of a ribbon or thin sheet onto a moving, smooth support which makes good contact with the extruded polymer and chills it rapidly to prevent large crystal formation. More specifically these objects are accomplished by extruding a molten fiber-forming synthetic linear polymer through a slot orifice onto a moving, smooth support, the opening of said slot being located within $\tfrac{3}{16}$ inch of the support and so directed that the line of flow of the polymer through the slot makes an angle of less than 90°, preferably less than 50°, with the surface of the support at the point of intersection with the line of flow of the polymer through the slot, insuring good contact between the polymer and the support, and maintaining the support at a temperature substantially below the melting point of the polymer. Advantageously, the temperature of the support is so regulated that the polymer is solidified and cooled during its contact with the support to a temperature at least 60° C. below its melting point within one second from the time it first begins to solidify, and preferably within one second from its initial time of contact with the support. If the support is a drum, the "surface of the support at the point of intersection" would be the tangent to the periphery of the drum at this point.

The polymers used in this invention differ from the products previously employed in making ribbons and films in that they are crystalline and behave like liquids when melted. They melt rather sharply to give relatively low viscosity liquids whereas prior film-forming materials soften on heating to give high viscosity plastic masses. This difference adds to the difficulty in extruding the molten polymer into films and necessitates a careful control of the cooling to insure the formation of clear films rather than an opaque film composed of large crystal aggregates. Although it has been proposed to form films from melts of the above mentioned polymers, it has not heretofore been possible to obtain in large scale production clear homogeneous films having uniform thickness.

In the accompanying drawing

Fig. 1 is a diagrammatic view in elevation of one form of apparatus useful in carrying out the process of this invention, Fig. 2 is a similar view of a modified arrangement of apparatus, Fig. 3 shows a further modified form, and Fig. 4 shows an enlarged view of the extrusion slot shown in Figs. 1 and 3.

In Fig. 1 the numerals 1 and 1' represent a pair of extrusion lips providing a slot orifice 2 through which the molten polymer flows to the face of a chromium plated steel drum or roll 3 at an angle of 45° with the tangent to the periphery of the drum at the point of intersection with the projection of the line of flow of the polymer through the slot, this line of flow being parallel with the inner walls of the slot. The extrusion lips are placed above the drum to provide a clearance of $\tfrac{1}{32}''$ between the drum and the lower edge or opening of the slot through which the polymer passes.

In Fig. 2 the extrusion lips 4 and 5 provide a vertically directed slot but the drum and lips are so arranged that the line of flow of the polymer passing through the slot makes an angle of 70° with the tangent to the drum at the point of intersection with the surface of the drum. The operation otherwise is as described in connection with Fig. 1.

Fig. 3 shows a reservoir 6 containing the molten polymer which flows through a valve 7 to a strainer 8 and then to a hopper 9 having extrusion lips forming a slot arranged so that the line of flow of the polymer through the slot makes an angle of 45° with the tangent to the drum at the point of intersection as in Fig. 1. The numeral 13 indicates a stripping roll around which the film is stripped from the drum and led to the wind-up roll 14. The numeral 10 represents an auxiliary contact roll for ironing the film flat. The numeral 11 indicates a doctor knife for removing the thin layer of air which at high casting speeds is swept along by the drum surface and which causes entrapment of air under the film.

In Fig. 4 the numerals 1 and 1' represent a pair of extrusion lips providing a slot orifice 2 through which the molten polymer flows from the approach channel 15 to the casting drum 3. The line of flow of the polymer through the slot orifice 2 is represented by line 16 which makes an angle 17 of less than 90°, preferably less than 50°, with the tangent 18 to the drum at the point of intersection 19.

In the process of this invention it is necessary to adjust the rate of extrusion, the thickness of the film, and the degree of cooling so as to give a clear, smooth film. The rate of extrusion is governed primarily by the pressure applied to the molten polymer fed to the extrusion slot. The thickness of the film is governed by the rate of extrusion, the width of the slot, and the speed of the casting drum. It is highly advantageous to have the casting wheel revolve at a greater peripheral speed than the linear velocity of the polymer stream through the slot orifice, because this insures a higher degree of uniformity in the film thickness and minimizes streaks and imperfections which may be introduced at the orifice. It is not possible to secure accurate control of the thickness and smoothness of the film by means of the slot alone. The polymers used in this invention are especially adapted to be drawn down in this manner. Preferably the "draw down," i. e. the ratio of the peripheral speed of the drum to the linear velocity of the polymer through the slot, is about 5:1, but ratios from 2:1 to 20:1 may be used effectively.

The rate of cooling must be sufficiently rapid to secure a clear film. Slow cooling results in the formation of large crystal aggregates which produce film opacity. Preferably the film is cooled without the use of a liquid since most liquids, including water, produce a surface haze in the film. It is desirable therefore to effect cooling by contact with the drum the surface of which is properly cooled, e. g. by internal means. The most critical stage in the cooling of the polymer is from its melting point down to about 60° C. below the melting point, since this is the stage in which formation of large crystal aggregates takes place most readily. It is important, therefore, that the cooling be as rapid as possible during this stage, preferably within one second. This does not mean that the molten polymer must be solidified as soon as it strikes the drum; in fact, it is desirable to permit the polymer to flow out on the drum surface because this improves the uniformity of the resultant film.

Since the cooling must be rapid and is brought about primarily by contact with the drum surface, it is necessary to have good contact between the film and the drum to secure the desired heat transfer. It is advantageous in the practice of this invention, and practically in the preparation of thicker films, to apply to the drum surface agents which improve the contact between the drum and film and thus promote better heat transfer. These agents are substances which are insoluble in the polymer and are preferably organic substances of high boiling points (above 125° C.) which are liquid at the temperature reached in the process. Suitable materials of this kind are tricresyl phosphate, chlorinated diphenyls, mineral oils, kerosene, and xylene. However, non-solvent liquids of lower boiling point, e. g. water, acetone and benzene, can be used with some success. In the manufacture of photographic films the contact agent may be one which also acts as a sub-coating solution thereby eliminating a subsequent treatment which is general practice with photographic film bases before applying the emulsion coating.

Another method for securing good contact is to maintain the drum substantially above room temperature, but at least 60° C. below the melting point of the polymer, as for instance 100° C., since the adherence of polyamide film increases with higher temperature. Increasing the temperature of the drum, however, limits the thickness to which films of good clarity can be made. For example, polyhexamethylene adipamide film can be readily obtained clear in thicknesses up to 0.012 inch with a drum at 15° C., while if the drum is maintained at 100° C. films of this polymer cannot be obtained clear in thicknesses greater than about 0.005 inch. It is desirable therefore to have the drum as cool as is possible without materially reducing the adherence of the film to the drum.

The invention is further illustrated by the following examples.

Example I

Fiber-forming polyhexamethylene adipamide having an intrinsic viscosity of 1.0 was prepared from hexamethylenediammonium adipate in a stainless steel autoclave of 2 lb. capacity by the procedure described in the above mentioned Patent 2,130,948. The molten polymer at a temperature of 270° C. was extruded at a speed of 3 feet per minute under 100 lbs./sq. in. $CO_2$ pressure through a 3.25" x 0.016" slot onto a chromium plated steel drum (3.5" diameter and 4" face) located $\frac{3}{32}$" below the opening of the slot as shown in Fig. 1. The line of flow of polymer through the slot made an angle of 45° with the tangent to the drum at the point of intersection. The drum, which had been cooled to 0° C. before starting, heated up to about 70° C. during the course of the extrusion. The peripheral speed of the drum was 15 feet per minute so that the "draw down" was 5 to 1. The film was stripped off after making approximately ¾ of a revolution in contact with the drum. About 100 feet of film 3.1" x 0.003" was obtained. The film was clear, flat, transparent and practically free from streaks.

Example II

A charge of 928 grams of caprolactam and 150 cc. of distilled water was placed in a stainless steel autoclave and polymer was made in a 6-hour heating cycle in which the water was bled off slowly, and the maximum temperature was 264° C. The resultant polyamide, which had an intrinsic viscosity of 0.74, was extruded at a temperature of 250° C. in the manner shown in Fig. 2 under 175 lbs./sq. in. $CO_2$ pressure through a 3.25" x 0.019" slot onto a chromium plated drum at a point about one inch beyond its crown. The drum, which had been cooled to about 0° C. by means of dry ice, was placed $\frac{1}{16}$" below the opening of the slot and was operated at a peripheral speed of about 15 feet per minute. In order to improve the adherence of the film to the drum a thin coating of petroleum jelly was applied to the surface of the drum as a contact agent. A clear, transparent film 3" x 0.015" was obtained having a tensile strength of 8100 lbs./sq. in. calculated on the original dimensions and 33,000 lbs./sq. in. when calculated on the dimensions at the break.

*Example III*

Eight pounds of polyhexamethylene adipamide of intrinsic viscosity 1.04 was formed into film by the apparatus shown in Fig. 3. The molten polymer, at a temperature of 276° C., was extruded under 200 lbs./sq. in. of nitrogen pressure through a 3.25"×0.017" slot in a direction at a 45° angle with the tangent to the drum at the point of intersection with the line of flow of the polymer through the slot. The drum was located 1/64" below the slot opening. The drum had a polished stainless steel surface and was 30" in diameter and 12" across the face. The drum was maintained at about 17° C. by the continuous circulation of cold water through its interior. The drum was rotated at a peripheral speed of 60 feet per minute which represented a draw down ratio of about 11:1. About 8 lbs. of ribbon 3" wide and having a thickness of 0.0015 was obtained.

Other film-forming synthetic linear polymers than those disclosed in the foregoing examples may be used, typical examples being polyesters, polyethers, polyurethanes, polythioureas, and ester-amide interpolymers, and other interpolymers and mixtures of these polymers. The invention is particularly adapted to the preparation of clear films from crystalline polymers. As an additional example of such a crystalline polymer might be mentioned the solid polymer of ethylene described in Patent 2,153,553. The compositions used in making the films may of course contain modifying agents, e. g. plasticizers.

It is desirable in the above described process to extrude the polymers in an inert atmosphere, as for instance carbon dioxide or nitrogen.

Although the present process is of primary interest in the preparation of clear films, it is also applicable to the production of tough uniform films from polymer compositions not yielding transparent films, as for instance from compositions containing fillers, opacifiers, and pigments.

It is to be understood that this process is not limited to the use of a drum since the desired results can also be achieved upon replacing the drum with another moving support, e. g. a continuous steel belt, to serve as a support and means for rapidly chilling the molten polymer after its contact with the support. Similarly it is not essential to the success of this casting process that the supporting surface be of metal; in fact, very favorable results have been obtained by casting polyamide films onto a glass roll. In the examples cited the casting speeds have varied from 7 to 60 feet per minute; but much greater speeds can be used.

The polymeric films obtained by the present process find wide use in industry. They are, for instance, useful as photographic film base, interlayer for safety glass, transparent wrapping material, artificial leather, coating for cloth and paper, floor coating, book binding and covers, automobile tops, diaphragms for loud speakers, diaphragms for automobile fuel pumps, wall covering material, window shades, playing cards, lamp shades, currency and policy paper, battery plate separators, membranes for musical drums, strips for straw hat fabrication, and as a glass substitute in such uses as aircraft windshields.

Because of their superiority in such desirable physical properties as clarity, smoothness, and uniformity in thickness, the products obtained by the process of this invention are adapted to commercial applications for which polyamide films prepared by other methods are less suited. In the case of polyhexamethylene adipamide the present process is of primary importance since it is very difficult to produce perfectly clear films free from surface haze from this highly desirable, pronouncedly crystalline film-forming material by other methods.

As many apparently widely different embodiments of this invention may be made without departing from the spirit and scope thereof, it is to be understood that I do not limit myself to the specific embodiments thereof except as defined in the appended claims.

I claim:

1. A process for forming films which comprises extruding molten synthetic linear polymer on a smooth, moving support through a slot orifice positioned within three-sixteenths of an inch of the support and so placed that the line of flow of the polymer through the slot makes an angle of less than 90° with the surface of said support at the point of intersection with said line of flow of polymer, insuring good contact between the extruded polymer and the support, and so regulating the temperature of the support that the polymer is solidified and cooled during its contact with the support to a temperature of at least 60° C. below its melting point within one second from the time it first begins to solidify.

2. A process for forming films which comprises extruding molten synthetic linear polymer on the periphery of a smooth, rotating drum through a slot orifice positioned within three-sixteenths of an inch of the periphery of the drum, the flow of polymer through the slot making an angle of less than 90° with the tangent to the drum at the point of intersection with said line of flow of polymer, so regulating the temperature of the drum that the polymer is solidified and cooled during its contact with the support to a temperature of at least 60° C. below its melting point within one second from the time it begins to solidify, and drawing to reduce the thickness of the film by rotating the drum at a peripheral speed of at least twice the extrusion speed of the molten polymer through said orifice.

3. A process for forming clear films which comprises extruding molten synthetic crystalline polymer on a smooth surface forming the periphery of a rotating drum through a slot orifice positioned within three-sixteenths of an inch of said surface, the line of flow of the polymer through the slot making an angle of less than 50° with the tangent to the drum at the point of intersection of said line of flow of polymer with the drum, so regulating the temperature of the drum that the polymer is solidified and cooled during its contact with the support to a temperature of at least 60° C. below its melting point within one second from the initial time of contact with the support, and rotating the drum at a peripheral speed substantially faster than the linear speed of the polymer extruded through said slot orifice.

4. The process set forth in claim 1 wherein said polymer is a polyamide.

5. The process set forth in claim 3 wherein said polymer is a polyamide.

6. The process set forth in claim 1 wherein said polymer is polyhexamethylene adipamide.

7. The process of claim 1 wherein the said good contact is facilitated by applying to the surface of the said moving support a liquid non-solvent for the said polymer.

8. The process of claim 1 wherein the said polymer is a polyamide and the said good contact is facilitated by applying to the said moving support a hydrocarbon boiling above 125° C.

9. The process of claim 2 wherein said polymer is a polyamide.

10. The process of claim 1 wherein an ironing roll is brought into contact with the exposed surface of the film formed on said moving support before said film has completely solidified.

11. The process of claim 1 wherein the extrusion of the molten synthetic linear polymer is effected in an inert atmosphere.

HENRY D. FOSTER.